United States Patent
Cerf et al.

(10) Patent No.: US 6,576,342 B1
(45) Date of Patent: *Jun. 10, 2003

(54) MULTILAYERED ARTICLE INCLUDING A VULCANIZED ELASTOMER ASSOCIATED DIRECTLY WITH A THERMOPLASTIC

(75) Inventors: Martine Cerf, Bernay (FR); Olivier Denizart, Cauge (FR); Christian Dousson, Bernay (FR)

(73) Assignee: Elf Atochem S.A., Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 08/505,183

(22) PCT Filed: Dec. 13, 1994

(86) PCT No.: PCT/FR94/01454

§ 371 (c)(1),
(2), (4) Date: Oct. 19, 1995

(87) PCT Pub. No.: WO95/16564

PCT Pub. Date: Jun. 22, 1995

(30) Foreign Application Priority Data

Dec. 13, 1993 (FR) ............................................. 93 14922

(51) Int. Cl.⁷ ................................................. B32B 9/00
(52) U.S. Cl. ...................... 428/413; 428/421; 428/492; 428/520
(58) Field of Search ................................ 138/137, 141, 138/DIG. 7; 428/36.6, 36.7, 36.8, 36.91, 421, 475.8, 413, 492, 520; 156/243, 244.13, 307.7

(56) References Cited

U.S. PATENT DOCUMENTS 4,866,127 A * 9/1989 Jacquemin ................... 525/90
4,905,735 A * 3/1990 Akiyoshi ..................... 138/137
5,026,583 A * 6/1991 Nakagawa ................. 428/36.8
5,132,182 A * 7/1992 Grosse-Puppendahl et al. .. 428/475.8
5,149,589 A * 9/1992 Naritomi ..................... 428/412
5,242,976 A * 9/1993 Strassel et al. ............... 525/72
5,320,888 A * 6/1994 Stevens ...................... 428/36.2
5,427,831 A * 6/1995 Stevens ...................... 428/36.2
5,637,407 A * 6/1997 Hert et al. ................. 428/474.7
5,643,526 A * 7/1997 Hert et al. .................. 264/476
5,662,975 A * 9/1997 Hert et al. ............... 428/36.91

FOREIGN PATENT DOCUMENTS

EP          607085        * 7/1994

OTHER PUBLICATIONS

Robert W. Lenz, "Organic Chemistry of Synthetic High Polymers", Interscience Publishers, pp. 704–713, Jan. 1967.*

* cited by examiner

Primary Examiner—Alexander S. Thomas
(74) Attorney, Agent, or Firm—Burns, Doane, Swecker & Mathis, L.L.P.

(57) ABSTRACT

Multilayered article including a functionalized and vulcanized elastomer adherent by itself to a thermoplastic chosen from polyamides, PBT, mixtures containing polyvinylidene fluoride and ethylene/vinyl alcohol and ethylene/tetrafluoroethylene copolymers.

Composite tubular article made up of an outer sheath of vulcanized elastomer adherent to a hydrocarbon-barrier thermoplastic or associated with an inner layer for producing imperviousness.

20 Claims, No Drawings

MULTILAYERED ARTICLE INCLUDING A VULCANIZED ELASTOMER ASSOCIATED DIRECTLY WITH A THERMOPLASTIC

BACKGROUND OF THE INVENTION

1. Technical Field of the Invention

The present invention relates to a multilayered article including a layer of elastomer overmoulded onto a thermoplastic and vulcanized so as to adhere directly to the latter.

It also relates to a process for the preparation of a composite article including a vulcanized elastomer associated directly with a thermoplastic.

In the case where the thermoplastic has barrier properties in respect of fuels or heating fluids, a double layer may be sufficient for the application of the invention in the form of pipes for petrol or conditioned air. In the case where the thermoplastic does not have barrier properties per se, one (or more) layer(s) will be needed inside, for the same purpose, in order to ensure the imperviousness.

2. Description of the Related Art

The processes for assembling articles (tubular ones or sheets) made of vulcanized elastomer (synthetic or natural) that is associated with thermoplastics which are commonly employed are based on the extrusion-sheathing of a thermoplastic previously coated with an adhesive. The outer layer of elastomer is then vulcanized in an autoclave with hot air, with steam pressure or with radiation, which are usual in the rubber industry.

Nevertheless, a considerable saving where the process is concerned could be achieved by doing away with the application of the adhesive.

DETAILED DESCRIPTION OF BEST MODE AND SPECIFIC/PREFERRED EMBODIMENTS OF THE INVENTION

One of the objectives of the present invention is to propose a process for the preparation of a composite article as defined above, avoiding the application of adhesive.

Another objective of the present invention is to propose an article as defined above exhibiting a high peel strength of the vulcanized elastomer sheath when subjected to the separating stress, preferably higher than 2 daN/cm.

The problems which the invention intends to solve are the following:

the interfacial adhesion in the case of multilayered articles (especially, in the case of tubular articles, between the outer elastomeric layer and the inner thermoplastic layer), the protection of thermoplastic pipes from hot spots by a vulcanized elastomer, an example of application in the motor vehicle sector.

For the conditioned air application the pipes are traditionally made of textile-reinforced rubber. With the new legislation, a barrier layer against fluorohydrocarbons must be incorporated, and this is done with a barrier thermoplastic. This barrier thermoplastic layer must be fine so as not to impair the acoustic damping properties of the rubber.

For the petrol pipe application these pipes are today made of textile-reinforced rubber. The problems related to the rubber are: the permeability, the swelling, the limited resistance to peroxidized fuel and the extraction of various products, resulting in the advantage of introducing a thermoplastic inner barrier layer.

The advantage of the interfacial adhesion is linked, among others, with the better properties of the pipes (flexibility, decrease in the crunching of the pipes and impact strength) and easier use during the fixing of connections than on a pipe consisting of two separate parts (a rubber jacket and a thermoplastic liner).

Other advantages linked with the use of the present invention will appear in the course of the description which follows.

Japanese Patent Application JP 5-44874 describes pipes with an outer layer of epichlorohydrin rubber and an inner layer of nylon or of a fluoro resin, but with the use of adhesive.

In Patent Applications DE 4232946 and GB 2023626 use has also been made of an adhesion promoter or of an adhesive for pipes made of polyamide (or fluoropolymer, in the former), covered with rubber.

French Patent FR 2660404 describes pipes produced by direct coextrusion of a vulcanizable elastomer on a polyolefin; the vulcanizable elastomer is chosen from nitrile-PVC or EPDM rubbers and nothing is said concerning the vulcanization or the mechanism which makes the adhesiveness possible.

German Application DE 3914011 describes a pipe including an outer layer of polyolefinic elastomer (devoid of carboxylic or other functional groups) and on inner layer of thermoplastic, for example polyamide, but it is accepted that it would be preferable to employ adhesive between the two layers—which is furthermore described explicitly in a subsequent application DE 4026161.

The vulcanized synthetic or natural elastomers which are suitable for making use of the present invention are well known to a person skilled in the art, the term "elastomer" in the definition of the present invention meaning that it may consist of mixtures of several elastomers.

These elastomers or elastomer mixtures exhibit a residual compression set (RCS) at 100° C. which is lower than 50%, generally between 5 and 40% and preferably lower than 30%. These vulcanized elastomers originate from the corresponding vulcanizable elastomers.

Among the latter there may be mentioned natural rubber, polyisoprene which has a high double-bond content in a cis position, a polymerized emulsion based on styrene/butadiene copolymer, a polymerized solution based on styrene/butadiene copolymer, a polybutadiene which has a high double-bond content in a cis position, obtained by catalysis with nickel, cobalt, titanium or neodymium, a halogenated ethylene/propylene/diene terpolymer, a halogenated butyl rubber, a styrene/butadiene block copolymer, a styrene/isoprene block copolymer, the halogenated products of the above polymers, an acrylonitrile/butadiene copolymer, an acrylic elastomer, a fluoro elastomer, an epichlorohydrin elastomer and chloroprene.

Some elastomers mentioned above may be functionalized by means of carboxylic (or anhydride), epoxy or amino groups, by grafting, in a known manner, of these elastomers or, in the case of elastomer mixtures, for example with acrylic elastomers.

Among the abovementioned elastomers those included in the following group will be advantageously chosen: carboxylated nitrile elastomers, acrylic elastomers, carboxylated polybutadienes, grafted ethylene/propylene/diene terpolymers, epichlorohydrin elastomers or mixtures of these polymers with the same elastomers but ungrafted, such as nitrile rubbers, hydrogenated nitriles, polybutadienes and ethylene/propylene/diene terpolymers, by themselves or mixed.

The thermoplastic may be chosen from polyamides 6, 66, 11 and 12 and preferably polyamides 11 and 12 (plasticized or otherwise) or their copolymers or blends of these polyamides with polyolefins, from polyesters (for example polybutylene terephthalate), ethylene/tetrafluoroethylene (ETFE) copolymers, copolymers containing ethylene/vinyl alcohol units and polyvinylidene fluoride (PVDF) or mixtures containing it.

Included in the term "polyvinylidene fluoride" is the homopolymer or the copolymers containing at least 70% by weight of vinylidene fluoride. The polyvinylidene fluoride may also be mixed with another thermoplastic polymer on condition that at least 50% by weight of polyvinylidene fluoride is present in the mixture.

An important example of a mixture containing polyvinylidene fluoride is the composition described in European Application EP 450994: a polymethacrylate plus an additive consisting of PVDF and of an acrylic or methacrylic elastomer.

The subject of the invention therefore includes a layer of rubber adherent to a thermoplastic, but it may also include one or a number of other layers, optionally secured by a binder; there is therefore: vulcanized rubber/thermoplastic/ other layers with or without bond, for example: PA12/ binder/PA6/EVOH/PA6 or PA12/binder/PVDF/PA12/PBT/ PA12.

The invention is particularly useful for sheathing pipes which have one of the abovementioned thermoplastics as outer layer: polyamides and their blends, polyesters, and the like.

Another subject of the invention is a process for the preparation of the composite articles described above, characterized in that a thermoplastic is overmoulded, at an appropriate temperature, with an elastomeric composition comprising a synthetic or natural elastomer optionally containing carboxylic (or dicarboxylic acid anhydride), epoxy or amino functional groups, a crosslinking system and optionally various adjuvants and fillers, and in that the layer of elastomeric composition obtained is vulcanized.

The vulcanization temperature is preferably between −5° C. and +30° C. in relation to the Vicat point of the said thermoplastic in contact with the elastomer.

The elastomeric composition and its vulcanization kinetics are such that the duration of the vulcanization cycle does not exceed 15 minutes and that the composite article exhibits a high peel strength of the vulcanized elastomer layer (preferably higher than 2 daN/cm).

The vulcanized elastomers and thermoplastics forming the composite material are normally associated sufficiently strongly to prevent any separation during a normal stress, bearing in mind the desired utilization. Thus, within the meaning of the present text, the term "separation" implies the application to the material of a force which is considerably higher than that to which the said material should normally be subjected.

The separation resistance is assessed by a peeling test on a strip of pipe less than 5 mm in width, cut along a generatrix. The peel strength will preferably be advantageously higher than 2 daN/cm.

In the case of a carboxylated unsaturated elastomer, the vulcanization of the rubber having taken place by virtue of the double bonds and of the carboxylic groups, it is necessary to prevent all the latter, which are more reactive, from being consumed for the crosslinking, since they are needed for the adhesion with the thermoplastic. This is why the vulcanization temperature must be controlled well to have a sufficiently long scorch time and thus the carboxylic groups which are still free must be allowed time to react with the thermoplastic.

According to an alternative form of the process the thermoplastic layer is overmoulded with the elastomer composition which is extruded on an elastomeric extruder at a temperature of between 50° C. and 120° C., in a sheathing die (that is to say a crosshead die). The unvulcanized article is placed, possibly after cutting out, in a conventional rubber vulcanization autoclave (especially with hot air, steam, infrared and the like) the temperature of which is between −5° C. and +30° C. in relation to the Vicat point of the said thermoplastic in contact with the elastomer.

According to another alternative form of the process the article is obtained by coextrusion of the elastomer at the same time as the thermoplastic(s). In this case the adhesion produced during the coextrusion process and the vulcanization operation are performed in line or by reprocessing.

The vulcanization systems employed for producing these composites are well known to a person skilled in the art and, consequently, the invention is not limited to systems of any one particular type. It suffices for the latter to meet the criterion relating to the vulcanization kinetics, defined in the definition of the invention indicated above.

When the elastomer is based on unsaturated monomer (butadiene, isoprene, vinylidenenorbornene, etc), four types of vulcanization systems may be mentioned:

sulphur systems consisting of sulphur used in combination with the usual accelerators such as dithiocarbamate metal salts (zinc or tellurium dimethyl-dithiocarbamate and the like), thiuram disulphides (thiuram tetramethyldisulphide, and the like), sulpheramides, and the like.

These systems may also contain zinc oxide used in combination with stearic acid.

Sulphur-donor systems, in which most of the sulphur employed for the bridging originates from sulphur-containing molecules such as the organosulophur compounds referred to above.

Systems containing phenolic resins, consisting of difunctional phenol-formaldehyde resins which may be halogenated, used in combination with accelerators such as stannous chloride or zinc oxide.

Peroxide systems. They make it possible to have a product which is more stable to heat, white, as in the case of the sulphur-donor systems. Any free radical donors may be employed (dicumyl peroxides and the like) in association with zinc oxide and stearic acid.

When the elastomer is acrylic (polybutyl acrylate with acidic or expoxy functional groups or any other reactive functional group permitting the crosslinking), the usual crose l inking agents are employed, which are based on diamines (ortho-toluidylguanidine, diphenylguanidine and the like) or on blocked diamines (hexamethylenediamine carbamate and the like).

When the elastomer is the epichlorohydrin elastomer (homopolymer, copolyme r or terpolymer), crosslinking agents based on amine (2-mercaptoimidazoline, triazines, and the like) are employed.

The elastomeric compositions may be modified for some special properties (for example improvement in the mechanical properties) by the addition of fillers such as carbon black, silica, kaolin, clay, talc, chalk and the like. These fillers may be surface-treated with silanes, polyethylene glycols or any other coupling molecule. In general the proportion of fillers in parts by weight is between 5 and 100 per 100 parts of elastomers.

In addition, the compositions may be made flexible using plasticizers such as petroleum-derived mineral oils, esters of phthalic acid or of sebacic acid, liquid polymer plasticizers such as optionally carboxylated polybutadiene of low mass and other plasticizers which are well known to a person skilled in the art.

The combinations of vulcanizing agent which are employed for making use of the process are such that they should allow a complete crosslinking of the elastomer according to kinetics which result in good properties of resistance to separation, as mentioned in the definition of the invention and, in general, in good rubber properties (measured as a residual compression set at 100° C., tensile mechanical properties and the like).

The vulcanization temperature in the autoclave will be advantageously between 130 and 190° C.

The kinetics measured with the aid of an oscillating rheometer will be advantageously such that the characteristic time for 90% vulcanization, $t_{90}$, does not exceed 15 minutes at 160° C. and advantageously will be between 5 and 10 minutes.

Furthermore, it has been found that the time of the beginning of vulcanization (or setting time) corresponding to an increase in torque of 0.2 Nm is an important factor for obtaining materials exhibiting good performance. Thus, it is advantageous that the abovementioned increase in torque should be reached in a time longer than or equal to 4 minutes at the moulding temperature, and preferably between 4 and 6 minutes.

EXAMPLES

The permeability of the pipes to petrol was measured by a static method at 23° C. with fuel C containing 15% of methanol (static method).

Example 1, Comparative

A composition produced in an internal mixer including, in parts by weight:

| | |
|---|---|
| CHEMIGUM NX 775 carboxylated nitrile elastomer (RCG 7343 elastomer, Goodyear trade name) | 70 |
| SK 70 PVC | 30 |
| Epoxidized soya oil | 1.5 |
| 17 MOK tin octyl | 0.3 |
| Zinc stearate | 0.3 |
| DOP (dioctyl phthalate) | 25 |
| WINGSTAY 29 (antioxidant, 4,4-bis-2,2-dimethylbenzyldiphenylamine from Goodyear) | 1 |
| POLYVEST C 70 (carboxylated polybutadiene from Hüls) | 4 |
| VN 3 silica (Degussa France) | 20 |
| KS 300 silica (Akzo) | 10 |
| PEG 4000 (polyethylene glycol from Hüls) | 3 |
| A 1100 silane (Union Carbide) | 1 |
| $TiO_2$ | 10 |

This composition was mixed on a roll with a vulcanization system of the following composition:

| | |
|---|---|
| Sulphur | 1 |
| VULKACIT J (N,N'-dimethyl-N,N'-diphenylthiuram disulphide from Bayer) | 2 |
| MBS ((2-morpholinothio)benzothiazole) | 2 |
| VULKALENT E (sulphenamide from Bayer) | 1 |
| Stearic acid | 1 |
| ZnO | 5 |

It was extruded on an elastomer extruder as a 6/10 mm pipe and then vulcanized at 160° C. for 10 minutes.

The petrol permeability of this tubular article was 850 $g/m^2 \times 24$ hours; the tubular article was found to be unmarked when folded and returned to its initial shape.

Example 2, Comparative

An extruded pipe of PA 12 Rilsan AESNTL was produced in ⅝ mm diameter. The petrol permeability of this pipe was 80 $g/m^2 \times 24$ hours per 1 mm thickness. When this tubular article is folded below a certain radius of curvature a crunching phenomenon occurs and the pipe is marked.

Example 3

The pipe of Example 2 was taken up on an elastomer sheathing plant extruding the composition of Example 1 at 90° C. through a sheathing die. The tubular article was then cut, slipped onto 6-mm metal rods and placed in an oven at 170° C. for 20 minutes. Its transverse dimensions after sheathing were 9/10 mm. The petrol permeability of this pipe is 80 $g/m^2 \times 24$ hours (static value). This tubular article can be folded to a much smaller radius of curvature than the pipe of Example 2 and does not retain any fold mark.

Example 4, Comparative

An extended pipe of PA 11 Rilsan BESNTL was produced in ⅝ mm diameter. The permeability of this pipe is 40 $g/m^2 \times 24$ hours. When this pipe is bent below a certain radius of curvature, a crunching phenomenon occurs and the pipe is marked.

Example 5

The pipe of Example 4 was taken up on an elastomer sheathing plant extruding the composition of Example 1 at 90° C. through a sheathing die. The tubular article is next cut, slipped onto 6-mm metal rods, and was placed in an oven at 180° C. for 20 minutes. Its transverse dimensions after sheathing were 9/10 mm. The petrol permeability of this pipe is 40 $g/m^2 \times 24$ hours. This tubular article can be bent to a much smaller radius of curvature than the pipe of Example 4 and does not retain any fold mark.

Example 6

A composition produced in an internal mixer including, in parts by weight:

| | |
|---|---|
| HYDRIN 2000 (copolymer of epichlorohydrin with ethylene oxide, R.M. from Zeon Chemicals) | 100 |
| Stearic acid | 1 |
| FEF N550 carbon black | 30 |
| Extrusil (silica from Degussa France) | 20 |
| MgO | 3 |
| $CaCO_3$ | 5 |

This composition was mixed on a roll with 1 part of ZISNET F (triazine from Zeon Chemical).

Furthermore a coextruded pipe of PA 12 Rilsan AESNTL and an Adhéflon® (of composition: 90% TPU/10% PVDF, called DHP1 in what follows) was produced in ⅝ mm diameter, with a 0.2-mm layer of DHP1. The petrol permeability of this tubular article is 80 g/m²×24 hours. When this pipe is folded below a certain radius of curvature a crunching phenomenon occurs and the pipe is marked.

The above pipe was taken up on an elastomer sheathing plant extruding the Hydrin-based composition as specified above at 90° C. through a sheathing die. The tubular article was then cut, slipped onto 6-mm metal rods and placed in an oven at 107° C. for 20 minutes. Its transverse dimensions after sheathing were 9/10 mm. The petrol permeability of this pipe is 80 g/m²×24 hours. This tubular article can be folded to a much smaller radius of curvature than the double-layer Rilsan 12/DHP1 pipe and does not retain any fold mark.

Example 7

A coextruded pipe of PA 11 Rilsan BESNTL and an Adhéflon® (of composition: 35% of modified PMMA sold by Rohm and Haas under reference Paraloid EXL 4151/30% of PVDF/35% of core/shell type acrylic elastomer with butadiene styrene core, sold by Rohm and Haas under reference EXL 3361), called DHP2 in what follows, was produced in 6/8 mm diameter, with a 0.2-mm outer layer of DHP2. The petrol permeability of this tubular article was 40 g/m²×24 hours. When this pipe is folded below a certain radius of curvature a crunching phenomenon occurs and the pipe is marked.

The above pipe was taken up on an elastomer sheathing plant, extruding the H drin-based composition specified in Example 6 at 90° C. through a sheathing die. The tubular article was then cut, slipped onto 6-mm metal rods and placed in an oven at 170° C. for 20 minutes. Its transverse dimensions after sheathing were 9/10 mm. The petrol permeability of this pipe was 40 g/m²×24 hours. This tubular article can be folded to a much smaller radius of curvature than the twin-layer Rilsan 11/DHP2 pipe and does not retain any fold mark.

Example 8

A coextruded pipe of PVDF and an Adheflon® (DHP2) was produced in 6/7 mm diameter with a 0.2-mm external layer of DHP2. The petrol permeability of this tubular article is 10 g/m²×24 hours.

The above pipe was taken up on an elastomer sheathing plant extruding the Hydrin-based composition specified in Example 6 at 90° C. through a sheathing die. The tubular article was then cut, slipped onto 6-mm metal rods and placed in an oven at 170° C. for 20 minutes. Its transverse dimensions after sheathing were 6/8 mm. The petrol permeability of this pipe was 10 g/m²×24 hours.

Example 9

A coextruded pipe of PA 11 Rilsan BESNTL and an Adhéflon® (DHP1) was produced in 6/8 mm diameter, with a 0.2-mm outer layer of DHP1. The petrol permeability of this tubular article was 40 g/m²×24 hours. When this pipe is folded below a certain radius of curvature a crunching phenomenon occurs and the pipe is marked.

The above pipe was taken up on an elastomer sheathing plant extruding the composition based on XNBR carboxylated nitrile rubber specified in Example 1 at 90° C. through a sheathing die. The tubular article was then cut, slipped onto 6-mm metal rods and placed in an oven at 160° C. for 20 minutes. Its transverse dimensions after sheathing were 9/10 mm. The petrol permeability of this pipe was 40 g/m²×24 hours. This tubular article can be folded to a much smaller radius of curvature than the twin-layer Rilsan 11/DHP1 pipe and does not retain any fold mark.

Example 10

A coextruded multilayer pipe of PVDF 1000 HD, an Adhéflon® (DHP2), a PA 12 Rilsan AESNTL and another layer of Adhéflon DHP2 was produced in 6/8 mm diameter with a 0.15-mm PVDF inner layer, a 0.15-mm DHP2 intermediate layer and a 0.15-mm DHP2 outer layer. The petrol permeability of this tubular article is 10 g/m²×24 hours.

The above pipe was taken up on an elastomer sheathing plant extruding the Hydrin-based composition specified in Example 6 at 90° C. through a sheathing die. The tubular article was then cut, slipped onto 6-mm metal rods and placed in an oven at 160° C. for 20 minutes. Its transverse dimensions after sheathing were 9/10 mm. The petrol permeability of this pipe is 10 g/m²×24 hours.

What is claimed is:

1. A multilayered article comprising a layer of vulcanized elastomer overmoulded directly on a thermoplastic layer, wherein the thermoplastic layer is a polyvinylidene fluoride containing mixture comprising polyvinylidene fluoride, polymethacrylate and an elastomer, the vulcanized elastomer being an epichlorohydrin elastomer or an elastomer functionalized with carboxylic, epoxy or amino groups.

2. The article of claim 1, wherein the elastomer has a residual compression set at 100° C. that is less than 50%.

3. The article of claim 2, wherein the residual compression set is between 5% and 40%.

4. The article of claim 2, wherein the residual compression set is less than 30%.

5. The article of claim 1, further comprising at least one filler selected from the group consisting of carbon black, silica, kaolin, clay, talc and chalk.

6. The article of claim 5, wherein the at least one filler is surface-treated with silane or polyethylene glycol.

7. The article of claim 1, further comprising a plasticizer selected from the group consisting of a petroleum-derived mineral oil, an ester of phthalic acid, an ester of sebacic acid and a liquid polymer plasticizer.

8. The article of claim 7, wherein the liquid polymer plasticizer is a carboxylated polybutadiene.

9. The article of claim 1, wherein the peel strength of the vulcanized elastomer layer is at least 2 daN/cm.

10. A multilayered article comprising a layer of vulcanized elastomer overmoulded directly on a thermoplastic layer, wherein the thermoplastic layer is a polyvinylidene fluoride containing mixture comprising polyvinylidene fluoride, polymethacrylate and an elastomer, the vulcanized elastomer being an epichlorohydrin elastomer or an elastomer functionalized with carboxylic, epoxy or amino groups, wherein the elastomer has a residual compression set at 100° C. that is less than 50%.

11. The article of claim 10, wherein the residual compression set is between 5% and 40%.

12. The article of claim 10, wherein the residual compression set is less than 30%.

13. The article of claim 10, further comprising at least one filler selected from the group consisting of carbon black, silica, kaolin, clay, talc and chalk.

14. The article of claim 13, wherein the at least one filler is surface-treated with silane or polyethylene glycol.

15. The article of claim 10, further comprising a plasticizer selected from the group consisting of a petroleum-derived mineral oil, an ester of phthalic acid, an ester of sebacic acid and a liquid polymer plasticizer.

16. The article of claim 15, wherein the liquid polymer plasticizer is a carboxylated polybutadiene.

17. The article of claim 10, wherein the peel strength of the vulcanized elastomer layer is at least 2 daN/cm.

18. A multilayered article comprising a layer of vulcanized elastomer overmoulded directly on a thermoplastic layer, wherein the thermoplastic layer is a polyvinylidene fluoride containing mixture comprising polyvinylidene fluoride, polymethacrylate and an elastomer, the vulcanized elastomer being an epichlorohydrin elastomer or an elastomer functionalized with carboxylic, epoxy or amino groups, wherein the peel strength of the elastomer is at least 2 daN/cm.

19. The article of claim 18, wherein the elastomer has a residual compression set at 100° C. that is less than 50%.

20. The article of claim 18, further comprising at least one of a filler and a plasticizer, wherein the filler is selected from the group consisting of carbon black, silica, kaolin, clay, talc and chalk and wherein the plasticizer is selected from the group consisting of a petroleum-derived mineral oil, an ester of phthalic acid, an ester of sebacic acid and a liquid polymer plasticizer.

* * * * *